United States Patent [19]

Fukami et al.

[11] Patent Number: 5,477,396
[45] Date of Patent: Dec. 19, 1995

[54] APPARATUS FOR RECORDING/ REPRODUCING DIGITAL SIGNALS AT VARIOUS SPEEDS

[75] Inventors: Tadashi Fukami, Kanagawa; Makoto Yamada, Tokyo; Tsutomu Kajiwara, Kanagawa, all of Japan

[73] Assignee: Sony Corporation, Tokyo, Japan

[21] Appl. No.: 94,921

[22] Filed: Jul. 22, 1993

Related U.S. Application Data

[63] Continuation of Ser. No. 617,703, Nov. 26, 1990, abandoned.

[30] Foreign Application Priority Data

Nov. 25, 1989 [JP] Japan ................................. 1-305883

[51] Int. Cl.$^6$ ................................. G11B 5/09; H04N 5/78
[52] U.S. Cl. ................................. 360/10.3; 360/51; 360/32
[58] Field of Search ................................. 360/70, 73.05, 360/73.07, 73.08, 51, 69, 8, 29, 32, 10.1, 10.3; 369/32, 44.1, 48

[56] References Cited

U.S. PATENT DOCUMENTS

| | | | |
|---|---|---|---|
| 4,594,621 | 6/1986 | Noguchi et al. | 360/70 X |
| 4,617,599 | 10/1986 | Noguchi et al. | 360/32 |
| 4,630,272 | 12/1986 | Fukami et al. | 371/37 |
| 4,862,297 | 8/1989 | Fukami et al. | 360/53 |
| 4,930,031 | 5/1990 | Nagahara et al. | 360/72.2 X |
| 4,942,487 | 7/1990 | Noguchi et al. | 360/70 X |
| 5,003,411 | 3/1991 | Nagahara et al. | 360/72.2 |
| 5,130,863 | 7/1992 | Yamashita et al. | 360/48 |
| 5,276,557 | 1/1994 | Nagashima et al. | 360/51 X |

FOREIGN PATENT DOCUMENTS 3841259 8/1989 Germany.
2217509 10/1989 United Kingdom.

OTHER PUBLICATIONS

Proceedings of the International Congress on Transportation Electronics, vol. P-183, 20 Oct. 1986, Dearborn, U.S., pp. 321–331; "Sony Digital Audio Tape", by Marc Finer.

*Primary Examiner*—Aristotelis Psitos
*Assistant Examiner*—Varsha A. Kapadia
*Attorney, Agent, or Firm*—Hill, Steadman & Simpson

[57] ABSTRACT

A digital signal processing circuit for processing and recording data at various selectable rates, having an input/output circuit for receiving and outputting a digital signal; a recording circuit for generating a recording signal based on a digital signal received by the data signal processing circuit; a playback circuit for retrieving recorded data; and a demodulation circuit for demodulating retrieved data. The processing and recording rates are determined by control data supplied to the circuit either via an operator or from a recorded signal.

5 Claims, 9 Drawing Sheets

| MODE BYTE | LSI OPERATION STATUS |
|---|---|
| 0 0 - - - - - - | A TYPE |
| 0 1 - - - - - - | B TYPE |
| 1 0 - - - - - - | C TYPE |
| 1 1 - - - - - - | D TYPE |
| - - 0 0 1 0 0 0 | AFTER REC. MODE / NORMAL MODE |
| - - 0 0 1 1 0 0 | AFTER REC. MODE / MULTI SPEED MODE |
| - - 0 0 0 0 0 0 | REPROD. MODE / NORMAL MODE |
| - - 0 0 0 1 0 0 | REPROD. MODE / MULTI SPEED MODE |
| - - 0 1 - 0 - - | REC. MODE / NORMAL MODE |
| - - 0 1 - 1 - - | REC. MODE / MULTI SPEED MODE |
| - - 0 1 - - 0 - | START REC. |
| - - 0 1 - - 1 - | READY FOR REC. |
| TEST SIGNAL REC. MODE | |
| - - 1 1 1 0 0 0 | A, B CH REC. AT fch/2 |
| - - 1 1 1 0 0 1 | A, B CH REC. AT fch/4 |
| - - 1 1 1 0 1 0 | A, B CH REC. AT fch/6 |
| - - 1 1 1 0 1 1 | A, B CH REC. AT fch/18 |
| - - 1 1 1 1 0 0 | A, B CH REC. AT fch/72 |
| - - 1 1 0 0 0 0 | A CH REC. AT fch/2 |
| - - 1 1 0 0 0 1 | A CH REC. AT fch/4 |
| - - 1 1 0 0 1 0 | A CH REC. AT fch/6 |
| - - 1 1 0 0 1 1 | A CH REC. AT fch/18 |
| - - 1 1 0 1 0 0 | A CH REC. AT fch/72 |
| - - 1 0 1 0 0 0 | B CH REC. AT fch/2 |
| - - 1 0 1 0 0 1 | B CH REC. AT fch/4 |
| - - 1 0 1 0 1 0 | B CH REC. AT fch/6 |
| - - 1 0 1 0 1 1 | B CH REC. AT fch/18 |
| - - 1 0 1 1 0 0 | B CH REC. AT fch/72 |

FIG. 3

| STATUS BYTE | LSI OPERATION STATUS |
|---|---|
| 0 0 — — — — — — | $f_s$ = 48 kHz |
| 0 1 — — — — — — | $f_s$ = 44.1 kHz |
| 1 0 — — — — — — | $f_s$ = 32 kHz |
| — — 0 0 — — — — | 2 ch |
| — — 0 1 — — — — | 4 ch |
| — — — — 0 0 — — | 16-BIT LINEAR QUANT. |
| — — — — 0 1 — — | 12-BIT NONLINEAR QUANT. |
| — — — — — — 0 0 | $T_P$ = 13.6 µm |
| — — — — — — 0 1 | $T_P$ = 20.4 µm |
| 1 0 0 — 0 1 — — | LONG PLAY MODE (LP MODE) |
| 0 1 — — — — 0 1 | 1.5-FOLD TRACK PITCH MODE |
| OTHERS | STANDARD MODE (SP MODE) |

| | | TYPE A | SAMPLING FREQUENCY | SYSTEM CLOCK |
|---|---|---|---|---|
| REC. (IN NORMAL MODE) | LP MODE | N = 1000 rpm<br>Vt = 4.075 mm/sec<br>R = 4.704 Mbps | $F_s$ | A |
| | SP MODE | N = 2000 rpm<br>Vt = 8.150 mm/sec<br>R = 9.408 Mbps | $F_s$ | A |
| REPROD. (IN NORMAL MODE) | LP MODE | N = 2000 rpm<br>Vt = 4.075 mm/sec<br>R = 9.408 Mbps<br>SEMINT SERVO | $F_s$ | A |
| | SP MODE | N = 2000 rpm<br>Vt = 8.150 mm/sec<br>R = 9.408 Mbps<br>ATF SERVO | $F_s$ | A |
| MULTI. REC. / REPROD. (REPROD. OR REC. IN MULTI. SPEED MODE) | LP MODE | N = 2000 rpm<br>Vt = 8.150 mm/sec<br>R = 9.408 Mbps<br>2 TIMES SPEED REC./ REPROD. | $2F_s$ | B |
| | SP MODE | — | — | — |
| AFTER-REC. MODE | LP MODE | Vt = 8.150 mm/sec<br>2 TIMES SPEED AFTER-REC. | $2F_s$ | B |
| | SP MODE | Vt = 8.150 mm/sec | $F_s$ | A |

FIG. 9

| | | TYPE B | SAMPLING FREQUENCY | SYSTEM CLOCK |
|---|---|---|---|---|
| REC. (IN NORMAL MODE) | LP MODE | N = 2000 rpm<br>Vt = 4.075 mm/sec<br>R = 4.704 Mbps | Fs | A |
| | SP MODE | N = 4000 rpm<br>Vt = 8.150 mm/sec<br>R = 9.408 Mbps | Fs | A |
| REPROD. (IN NORMAL MODE) | LP MODE | N = 4000 rpm<br>Vt = 4.075 mm/sec<br>R = 9.408 Mbps<br>SEMI NT SERVO | Fs | A |
| | SP MODE | N = 4000 rpm<br>Vt = 8.150 mm/sec<br>R = 9.408 Mbps<br>ATF SERVO | 2Fs | A |
| MULTI. REC. / REPROD. (REPROD. OR REC. IN MULTI. SPEED MODE) | LP MODE | N = 4000 rpm<br>Vt = 8.150 mm/sec<br>R = 9.408 Mbps<br>2TIMES SPEED REC. / REPROD. | 2Fs | B |
| | SP MODE | — | — | — |
| AFTER-REC. MODE | LP MODE | Vt = 8.150 mm/sec<br>2TIMES SPEED AFTER-REC. | 2Fs | B |
| | SP MODE | Vt = 8.150 mm/sec | Fs | A |

FIG.10

| | | TYPE C | SAMPLING FREQUENCY | SYSTEM CLOCK |
|---|---|---|---|---|
| REC. (IN NORMAL MODE) | LP MODE | N = 1000 rpm<br>Vt = 4.075 mm/sec<br>R = 2.352 Mbps | $F_s$ | A |
| | SP MODE | N = 2000 rpm<br>Vt = 8.150 mm/sec<br>R = 4.704 Mbps | $F_s$ | A |
| REPROD. (IN NORMAL MODE) | LP MODE | N = 4000 rpm<br>Vt = 4.075 mm/sec<br>R = 9.408 Mbps<br>SEMI NT SERVO | $F_s$ | A |
| | SP MODE | N = 4000 rpm<br>Vt = 8.150 mm/sec<br>R = 9.408 Mbps<br>SEMI NT SERVO | $F_s$ | A |
| MULTI. REC. / REPROD. (REPROD. OR REC. IN MULTI. SPEED MODE) | LP MODE | N = 4000 rpm<br>Vt = 16.30 mm/sec<br>R = 9.408 Mbps<br>4TIMES SPEED REC./REPROD. | $2F_s$ | B |
| | SP MODE | N = 4000 rpm<br>Vt = 16.30 mm/sec<br>R = 9.408 Mbps<br>2TIMES SPEED REC./REPROD. | $2F_s$ | B |
| AFTER-REC. MODE | LP MODE | Vt = 16.30 mm/sec<br>4TIMES SPEED AFTER-REC. | $2F_s$ | B |
| | SP MODE | Vt = 16.30 mm/sec<br>2TIMES SPEED AFTER-REC. | $2F_s$ | B |

| | | TYPE D | SAMPLING FREQUENCY | SYSTEM CLOCK |
|---|---|---|---|---|
| REC. (IN NORMAL MODE) | LP MODE | N = 1000 rpm<br>Vt = 4.075 mm/sec<br>R = 2.352 Mbps | $F_s$ | A |
| | SP MODE | N = 2000 rpm<br>Vt = 8.150 mm/sec<br>R = 4.704 Mbps | $F_s$ | A |
| REPROD. (IN NORMAL MODE) | LP MODE | N = 2000 rpm<br>Vt = 4.075 mm/sec<br>R = 4.704 Mbps<br>SEMI NT SERVO | $F_s$ | A |
| | SP MODE | N = 2000 rpm<br>Vt = 8.150 mm/sec<br>R = 4.704 Mbps<br>ATF SERVO | $F_s$ | A |
| MULTI. REC. / REPROD. (REPROD. OR REC. IN MULTI SPEED MODE) | LP MODE | N = 2000 rpm<br>Vt = 8.150 mm/sec<br>R = 4.704 Mbps<br>2 TIMES SPEED REC. / REPROD. | $2F_s$ | B |
| | SP MODE | — | — | — |
| AFTER-REC. MODE | LP MODE | Vt = 8.150 mm/sec<br>2 TIMES SPEED AFTER-REC. | $2F_s$ | B |
| | SP MODE | Vt = 8.150 mm/sec | $F_s$ | A |

FIG. 11

APPARATUS FOR RECORDING/ REPRODUCING DIGITAL SIGNALS AT VARIOUS SPEEDS

This is a continuation of application Ser. No. 07/617,703, filed Nov. 26, 1990 now abandoned.

BACKGROUND OF THE INVENTION

The present invention generally relates to digital signal processing circuits. More particularly, the invention relates to a digital signal processing circuit employed in a magnetic recording and playback apparatus for recording and playing back digital audio signals.

A digital audio tape recorder comprises one type of magnetic recording and playback apparatus having a rotary drum arrangement to record and playback digital audio signals. The digital audio tape recorder is capable of converting an audio signal comprising analog elements into a digital signal for recording and playback. This feature makes it possible to effectively avoid degradation in sound quality while the audio signal is being recorded and playback with high degrees of density.

One way to improve the ease of use and recording quality of the digital audio tape recorder is to switch its recording and playback speeds. This switching, as with conventional analog signal tape recorders, allows magnetic tapes to run at multiples of the standard speed so that the tapes may be run, for example two times, three times, or four times as fast as the standard speed.

Switching the recording and playback speeds of the digital audio tape recorder affords another benefit: widening of the scope of its use. For example, the digital audio tape recorder can also function as an external memory device for use with a computing apparatus. In operation, the recorder records and plays back serial digital data in place of digital audio signals at a speed compatible with the data transmission rate of the computer apparatus.

However, prior art digital audio tape recorders of this kind inevitably lose some digital data in their digital signal processing circuit if the magnetic tape running speeds are simply switched in the same manner as they are on conventional tape recorders. In such digital audio tape recorders, it has been practically impossible to overcome the problems resulting from switching of the recording and playback speeds.

SUMMARY OF THE INVENTION

The present invention provides a digital signal processing circuit allowing digital signals to be recorded and played back at various recording and reproducing speeds while effectively preventing the occurrence of data losses.

To this end, in an embodiment, the invention provides a digital tape recorder with a digital signal processing circuit and a magnetic tape wound around a rotary drum, the tape running at a constant speed relative to a rotating speed of the drum, the drum rotating speed and the tape running speed being changed in accordance with predetermined control data $D_{CONT}$ that a digital signal entering a digital signal input/output circuit is converted by a recording signal processing circuit to a recording signal for recording onto the magnetic tape and/or a playback signal $S_{RF}$ from the magnetic tape is converted by a playback signal demodulation circuit to the digital signal for output via the digital signal input/output circuit; operating frequencies of the digital signal input/output circuit, the recording signal processing circuit, and the playback signal demodulation circuit being switched in accordance with the control data $D_{CONT}$.

These and other features as well as the nature, principal, and utility of the invention will become more apparent from the following detailed descriptions and accompanying drawings.

BRIEF DESCRIPTION OF THE DRAWINGS

FIG. 3 is a table illustrating a mode byte used in conjunction with the preferred embodiments of the invention.

FIG. 4 is a table depicting data of a status byte used in conjunction with preferred embodiments of the invention.

FIG. 6 is a table that describes how the type A rotary drum of FIG. 5 functions.

FIGS. 9 through 11 are tables that describe how the rotary drums of FIG. 8 function.

DETAILED DESCRIPTION OF THE PRESENTLY PREFERRED EMBODIMENTS

Figure 1:
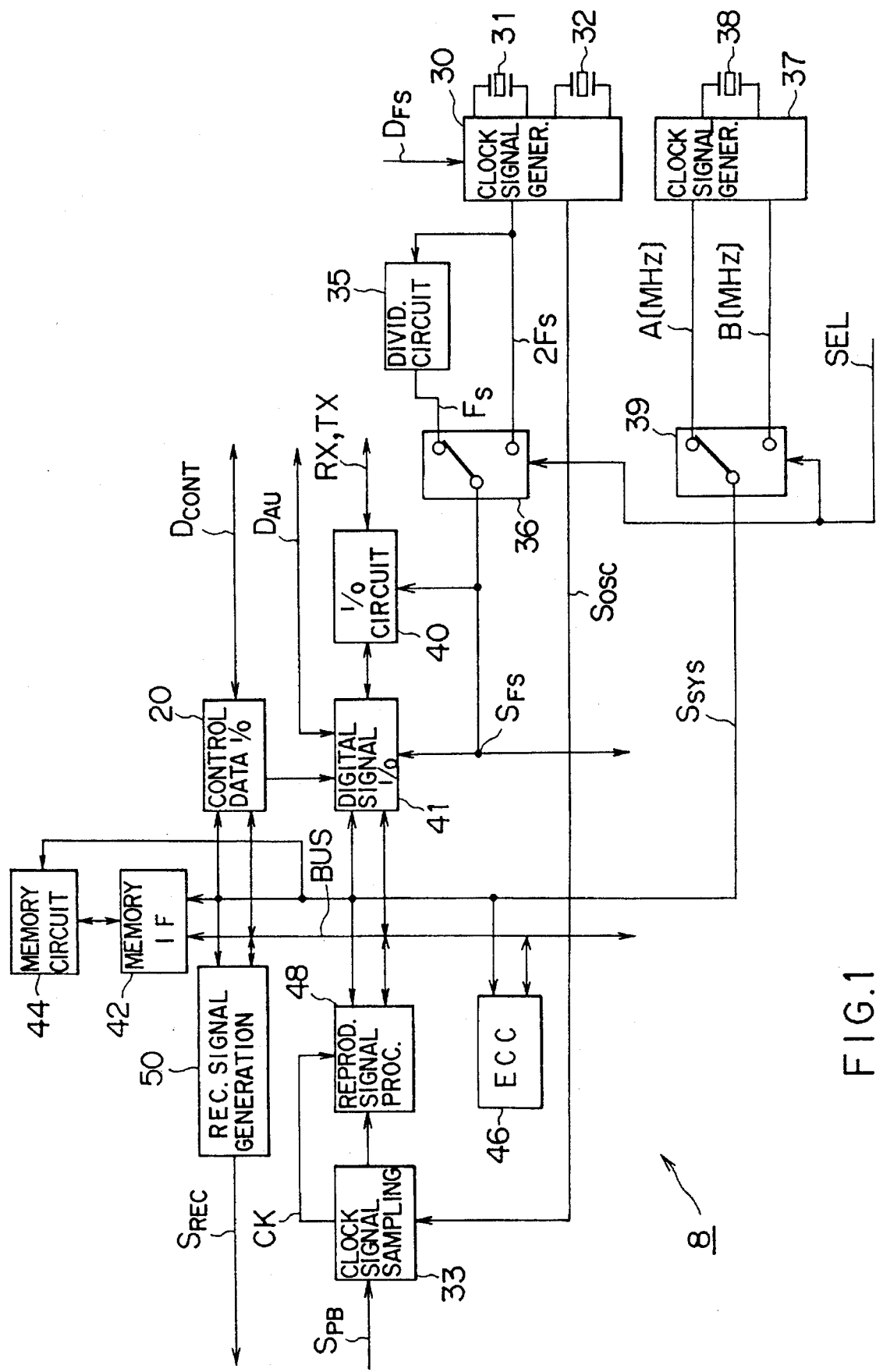
FIG. 1 is a block diagram of a digital signal processing circuit that can be used in conjunction with the tape recorder circuit of FIG. 2.
Figure 2:
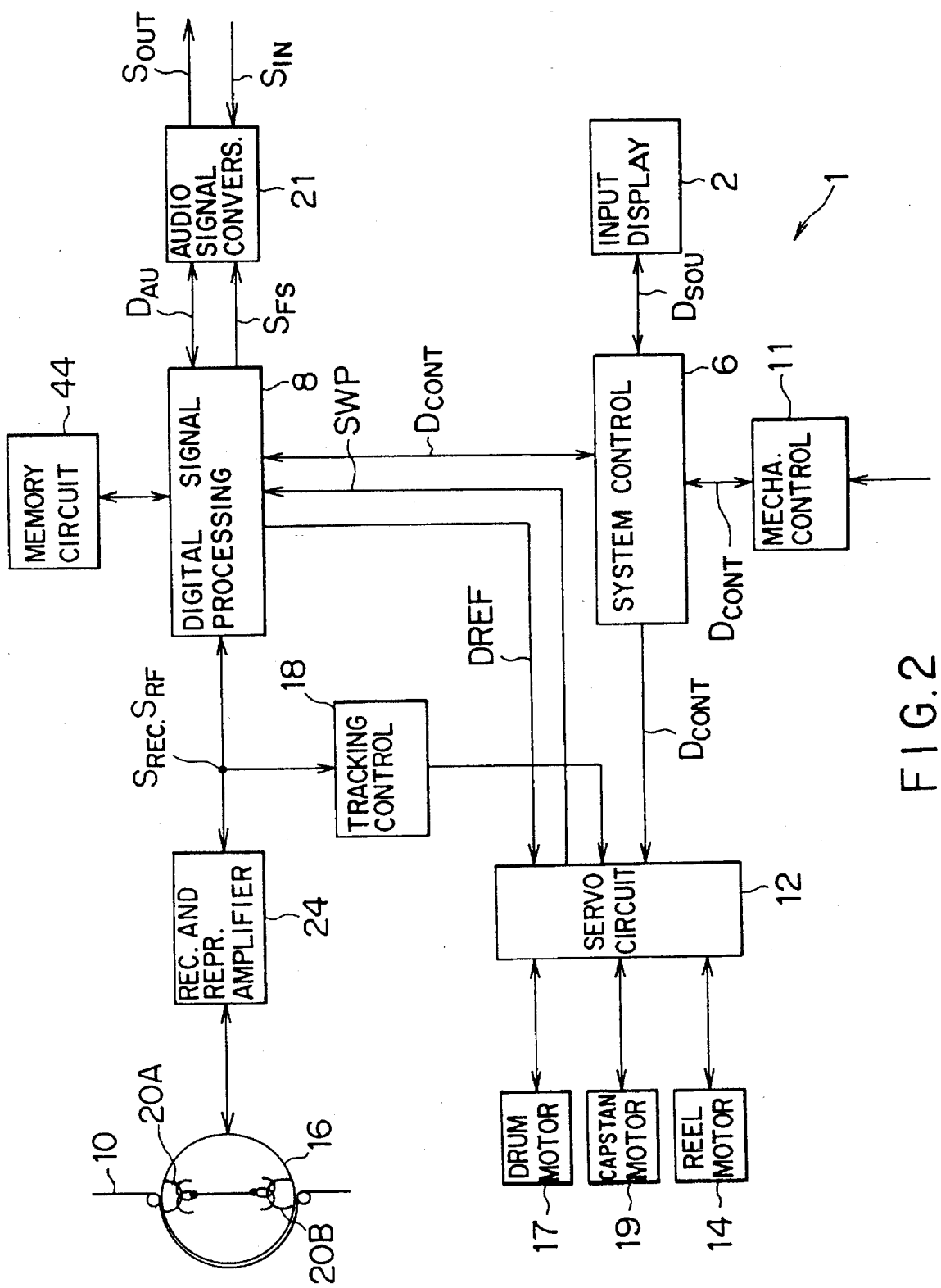
FIG. 2 is a block diagram of a digital tape recorder.

In FIGS. 1 and 2 there is illustrated in block diagram form a circuit for a digital audio tape (DAT) recorder 1 embodying principles of the invention.

FIG. 2 illustrates the overall arrangement of the DAT recorder 1. FIG. 1 illustrates a digital signal processing circuit 8 that can be used in the arrangement of FIG. 2. As is known, a DAT recorder can be used to convert analog stereo audio signals into digital signals for recording purposes.

In one aspect of its operation, the DAT recorder 1 has an input display circuit 2 that outputs operation data $D_{SOU}$ in response to an operator's actions and also switches on or off suitable displays on a display panel (not shown) in accordance with appropriate control data. The operator's input can be made via a keyboard and the display panel can comprise liquid crystal display (LCD) elements.

The DAT recorder has three basic modes: recording, after recording, and playback. Further, the DAT recorder has a long play (LP) mode and a standard play (SP) mode discussed further below.

In recording, a system control circuit 6 generates control data $D_{CONT}$ in accordance with the operation data $D_{SOU}$ and further configuration data, which configuration data is established in advance to reflect the configuration of the DAT recorder 1, such as the selected rotary drum arrangement. The control data $D_{CONT}$ is referenced when recording digital audio signals in response to the operator's actions.

In playback, the control data $D_{CONT}$ is generated by the system control circuit 6 in accordance with status byte data supplied by the digital signal processing circuit 8, the operation data $D_{SOU}$, and the configuration data.

The control data $D_{CONT}$ is thus used for two purposes: to switch the operation mode of the DAT recorder 1 in response to the operator's actions and to effect playback of digital audio signals from a magnetic tape 10 in accordance with the recording format recorded thereon.

Configuration of Control Data $D_{CONT}$

The control data $D_{CONT}$ preferably comprises serial data in the form of a byte, which byte is used both as a mode byte and as a status byte, each byte comprising eight (8) bits.

In FIG. 3, a table is provided to illustrate the correlations between the various bits of the mode byte and the various modes of the DAT recorder 1. As illustrated, the two highest-order bits in the mode byte identify the diameter of the rotary drum 16 as well as magnetic head rotation. In the one embodiment, a two bit value is set in a servo circuit 12 in accordance with the configuration of the rotary drum 16 and other configuration settings, the two bit value being output as the two highest-order bits from the system control circuit 6. Preferably, the two-bit values "00", "01", "10", and "11" indicate whether the configuration of the rotary drum 16 and the magnetic heads of the DAT recorder 1 is of type "A", "B", "C", or "D", respectively. These various configuration types are discussed below.

The third highest-order bit of the mode byte preferably identifies whether the DAT recorder 1 is in its test signal recording mode. When the third highest order bit is set to "1", it preferably means that the DAT recorder 1 is in its test signal recording mode.

The fourth highest order bit of the mode byte preferably identifies whether the DAT recorder 1 is in a recording mode. When the fourth highest order bit is set to a "1", it preferably means that the DAT recorder 1 is in its recording mode.

The fifth highest order bit of the mode byte preferably indicates whether the DAT recorder 1 is in an after-recording mode. When the fifth highest order bit is set to a "1", it preferably means that the DAT recorder 1 is in its after recording mode.

The sixth highest order bit of the mode byte preferably indicates whether the DAT recorder 1 is in normal speed mode or, multiple speed mode, the normal speed mode being a mode in which recording or playback is undertaken at a normal tape speed, and the multiple speed mode being a mode in which recording or playback is undertaken at tape speeds that are multiples of the normal tape speed. A setting of the sixth highest order bit to a "0" preferably means that the DAT recorder 1 will rewind or playback in a normal speed mode while a setting of the sixth highest order bit to a "1" preferably means that the DAT recorder 1 will rewind or playback in a multiple speed mode.

The table of FIG. 3 should be self explanatory. However, it should be noted that a hyphen is inserted whenever the value of a particular bit is not of concern.

As an example, a mode byte of "--001000", preferably means that the DAT recorder 1 is in its after recording mode and the tape speed is set to a normal mode. A mode byte of "--001100" preferably means that the DAT recorder 1 is in it after recording mode and the tape speed is set to the multiple speed mode.

Similarly, a mode byte of "--01-0--" or "--01-1-1--" preferably means that the DAT recorder 1 is in its recording mode and the tape speed is set to either the normal mode or multiple speed mode respectively. A mode byte of "--01--0-" preferably indicates that the DAT recorder 1 has started recording while a mode byte of "--01--1-" preferably indicates that the DAT recorder 1 is ready for recording.

Referring now to FIG. 4, the status byte is generated during recording by the system control circuit 6 in accordance with the control data $D_{SOU}$. When the tape recorder 1 is in its playback mode or after-recording mode, the status byte is generated by the digital signal processing circuit 8 in accordance with sub-code data recorded on the magnetic tape 10.

The two highest-order bits of the status byte, also referred to as $D_{FS}$, represent a sampling frequency $f_S$ of the digital audio signal. The next two highest-order bits indicate the number of channels over which audio signals are recorded or played back by the digital audio tape recorder 1.

The fifth and the sixth highest-order bits identify the type of quantization in effect when an audio signal is converted to a digital audio signal and vice-versa. The seventh and the eighth highest-order bits identify a track pitch value $T_P$.

Accordingly, a status byte of "100-01-" preferably means that a two-channel audio signal subjected to a 12-bit non-linear quantization at a sampling frequency of 32 KHz is recorded in long play (LP) mode on the magnetic tape, or is played back therefrom in LP mode. A status byte of "01 - - - 01" preferably means that a magnetic tape recorded at 1.5 times the normal track pitch is reproduced in 1.5-fold track pitch mode. A status byte other than "100-01--" or "01 - - - 01" means that the magnetic tape is recorded in standard play (SP) mode, or the magnetic tape recorded in SP mode is played back.

Mechanical Control and Servo Circuit with reference again to FIG. 2, the DAT recorder 1 also includes a mechanical control circuit 11 that controls a tape cassette loading/ejecting mechanism, a magnetic tape loading mechanism, and other parts. The control is formulated in accordance with the control data $D_{CONT}$ provided by the system control circuit 6.

A servo circuit 12 is provided that drives a reel motor 14 according to the control data $D_{CONT}$, thereby rotating the reels of a magnetic tape cassette, not shown, at a predetermined speed. The servo circuit 12 also generates a switching pulse signal SWP whereby the signal level is switched on each revolution of the rotary drum 16 and, as per the control data $D_{CONT}$, drives a drum motor 17 so that the switching pulse signal SWP reaches a predetermined phase relative to a rotating drum reference signal DREF.

A rotary drum reference signal DREF preferably comprises a reference signal having a duty factor of 50%, the signal being repeated at interleaving intervals of 60 msec in LP mode and 30 msec in SP mode during normal recording or reproduction. In view of the reference signal DREF, and as the control data $D_{CONT}$, the rotary drum 16 is controlled to rotate by an appropriate amount in each interleaving period.

In addition, the servo circuit 12 drives a capstan motor 19 with reference to a tracking error signal provided by tracking control circuit 18, thereby providing tracking control while letting the magnetic tape run at a speed dictated by the control data $D_{CONT}$. In this manner, the servo circuit 12 switches the running speed of the magnetic tape 10 and the rotating speed of the rotary drum 16 in accordance with the control data $D_{CONT}$, digitally records an audio signal on the tape 10 in the format specified by the operator's action, and plays back the digital audio signal from the tape 10 in view of the recording format recorded thereon.

Type A Configuration Operation

Figure 5:
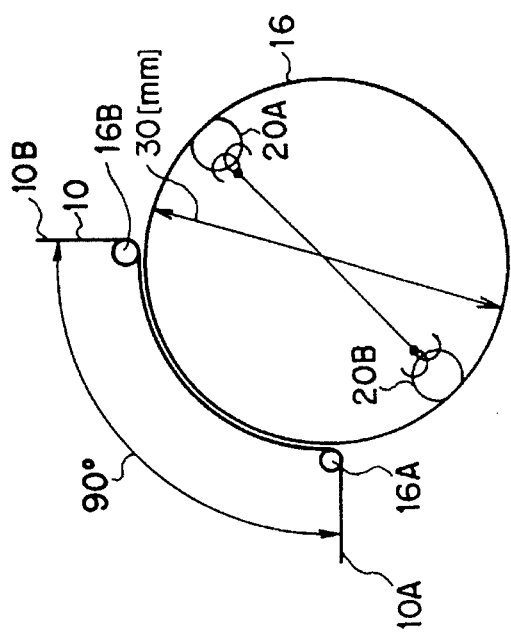
FIG. 5 is a schematic plan illustrating how a type A rotary drum can be constructed.

Referring to FIG. 5, a first embodiment is constructed to be of the type A configuration. That is, a pair of magnetic heads 20A and 20B having different azimuth angles are located 180 degrees apart relative to each other on the rotary drum 16. The drum 16 preferably has a diameter of 30 mm. The magnetic tape 10 is then wound around a portion of the rotary drum 16 and held there against by rollers 16A and 16B so as to form a 90-degree angle between the tape leads 10A and 10B leading to and exiting from the drum 16, as illustrated.

Referring to FIG. 6, it can be appreciated that the servo circuit 12 switches the DAT recorder 1 between the various operation modes according to the control data $D_{CONT}$. For long-play (LP) recording in the recording mode, the servo control circuit 12 drives the drum motor 17 and capstan motor 19 so that the rotating speed N of the rotary drum 16 reaches 1000 rpm and the running speed $V_t$ of the magnetic tape 10 attains a speed of 4.075 mm/sec.

For standard-play recording in the recording mode, the servo circuit 12 drives the drum motor 17 and capstan motor 19 so that the rotating speed N of the rotary drum 16 reaches 2000 rpm and the running speed $V_t$ of the magnetic tape 16 reaches 8.150 mm/sec. In this manner, scanning loci are formed successively on the magnetic heads 20A and 20B in accordance with the format specified for the currently configured digital audio tape recorder.

For playback in normal mode, the drum motor 17 is driven so that the rotating speed N of the rotary drum 16 reaches 2000 rpm, while the capstan motor 19 is driven so that the running speed reaches 4.075 mm/sec in LP mode and 8.150 mm/sec in SP mode.

Thus in playback in normal mode, the rotary drum 16 rotates at the same timing as for SP mode recording in normal mode. Where a magnetic tape 10 recorded in SP mode is reproduced, the tape 10 is controlled to run by one recording track per cycle of scanning by the magnetic heads 20A and 20B.

During SP mode playback, the servo circuit 12 provides tracking control using the so-called automatic track finding (ATF) method as per the tracking error signal from the tracking control circuit 18. When a magnetic tape 10 recorded in LP mode is played back, the rotary drum 16 rotates at twice the recording speed. Accordingly, the magnetic heads 20A and 20B each scan the magnetic tape 10 twice while the tape runs over one recording track.

In this way, the digital signal processing circuit 8 repeatedly acquires the playback signal $S_{RF}$ during LP mode playback. Selective processing of the playback signal $S_{RF}$ allows digital audio signals to be played back as desired. Meanwhile, the servo circuit 12 provides tracking control (so-called semi-NT servo) as per the tracking error signal from the tracking control circuit 18 so that the magnetic heads 20A and 20B scan each required recording track twice on the magnetic tape 10.

In multiple speed recording or playback (i.e., recording or playback in multiple speed mode), the servo circuit 12 drives the drum motor 17 and capstan motor 19 so that the rotating speed N of the rotary drum 16 reaches 2000 rpm and the running speed $V_t$ of the magnetic tape 10 reaches 8.150 mm/sec. In this way, with the rotary drum 16 rotating at the same speed as in LP recording mode relative to the magnetic tape 10, the servo circuit 12 provides control so that the rotary drum 16 and the magnetic tape 10 in multiple speed mode operate two times as fast as in normal recording mode.

Thus in multiple speed recording/playback mode, the recording signal is supplied to the magnetic heads 20A and 20B in half of the normal recording cycle and at two times the normal transmission speed. This permits recording of the digital audio signal in the same format as for normal recording; in playback mode, the playback signal $S_{RF}$ is acquired with its signal level varying in half of the normal cycle of playback.

In the after-recording mode, the servo circuit 12 controls the drum motor 17 and capstan motor 19 so that the magnetic tape 10 runs and the rotary drum 16 rotates at the same speeds as in two times speed recording/playback mode. That is, in after-recording SP mode, the servo circuit 12 drives the rotary drum 16 and capstan motor 19 at the same timing as in normal mode; in LP mode, the servo circuit 12 drives these parts at the same timing as in two times speed recording/playback mode for ATF servo tracking control.

Processing the Audio Signal

Also included is an audio signal conversion circuit 21 that comprises an analog-to-digital conversion circuit, a digital-to-analog conversion circuit and a digital filter circuit, the circuits operating in reference to a clock signal $S_{FS}$ from the digital signal processing circuit 8. In recording mode, a stereo audio signal $S_{IN}$ entering the digital audio tape recorder 1 is converted to the digital audio signal $D_{AU}$ for output to the digital signal processing circuit 8. In playback mode, the digital audio signal $D_{AU}$ from the digital signal processing circuit 8 is converted by the audio signal conversion circuit 21 into an analog signal $S_{OUT}$ for output.

Meanwhile, in recording mode, the digital signal processing circuit 8 converts the digital audio signal $D_{AU}$ to the recording signal $S_{REC}$ as per the control data $D_{CONT}$. The recording signal $S_{REC}$ is output via a recording and playback amplifier circuit 24 to the magnetic heads 20A and 20B. The digital audio signal $D_{AU}$ is recorded in this way on the magnetic tape 10 in the format specific to the currently configured digital audio tape recorder.

Switching from recording mode to playback mode is achieved in accordance with the control data $D_{CONT}$ and as per the sub-code data obtained by demodulating a playback signal $S_{RF}$ retrieved from the tape. After the switch, the playback signal $S_{RF}$ is converted to the digital audio signal $D_{AU}$ for output to the audio signal conversion circuit 21. The playback signal $S_{RF}$ from the magnetic heads 20A and 20B is demodulated so as to produce the digital audio signal $D_{AU}$.

In the digital signal processing circuit 8, as depicted in FIG. 1, a control data I/O circuit 20 places the control data $D_{CONT}$ from the system control circuit 6 into a predetermined area of a memory circuit 44 via a bus arrangement and a memory interface circuit 42.

In playback mode, the control data I/O circuit 20 reads the status byte data from the sub-code data that was demodulated and placed in the memory circuit 44. The circuit 20 then sends the status byte data to the system control circuit 6. This causes the recording data recorded on the magnetic tape 10 to be retrieved therefrom and transmitted to the system control circuit 6.

In this manner, the memory circuit 44, in recording mode, accommodates as the control data $D_{CONT}$ the status byte and mode byte generated by the system control circuit 6. In playback mode, the memory circuit 44 admits as the control data $D_{CONT}$ both the mode byte data generated by the system control circuit 6 and the status byte data made up of the recording data recorded on the magnetic tape 10.

In the foregoing setup, the digital signal processing circuit 8, in recording mode, outputs the recording signal $S_{REC}$ in response to the operator's action and in accordance with the configuration of the rotary drum 16. In playback mode, the digital signal processing circuit 8 demodulates the playback signal $S_{RF}$ according to the rotary drum configuration and the recording format.

A clock signal generation circuit 30 drives crystal oscillators 31 and 32 to generate oscillation output signals at frequencies of 22.5792 MHz and 49.152 MHz. These signals are used as the reference in generating necessary clock signals.

The clock signal generation circuit 30 waveform-rectifies the oscillation output signal at 49.152 MHz into a reference clock signal $S_{OSC}$. This clock signal is output to a clock signal sampling circuit 33 to sample a playback clock signal.

The clock signal generation circuit 30 converts each of the oscillation output signals with the frequencies of 22.5792 and 49.152 MHz into a reference clock signal $2F_S$ which is twice the sampling frequency of 48, 44.1 or 32 KHz specific to the digital audio tape recorder 1. The reference clock signal $2F_S$ is selectively output in accordance with the high-order two-bit data $D_{FS}$ in the status byte. Then, a dividing circuit 35 divides the applicable reference clock signal $2F_S$ in half to generate the reference clock signal $F_S$ with the sampling frequency of 48, 44.1 or 32 KHz.

A selection circuit 36 switches its contacts according to a switching signal SEL generated by the digital signal processing circuit 8 based on the control data $D_{CONT}$. In this way, the circuit 36 outputs the reference clock signal $F_S$ or $2F_S$ in normal mode or in multiple speed recording/playback mode, respectively, for selective output to the audio signal conversion circuit 21 (FIG. 2), an I/O circuit 40, or the digital signal I/O circuit 41.

In turn, the clock signal generation circuit 37 drives the crystal oscillator 38 to generate an oscillation output signal with a frequency of 18.826 MHz. The circuit 37 then divides the oscillation output signal to generate system block signals with frequencies A and B (MHz).

A selection circuit 39 switches its contacts according to the switching signal SEL generated by the digital signal processing circuit 8. In this way, the circuit 39 outputs a system clock signal $S_{SYS}$ at the frequency A or B (MHz) in coordination with the selection circuit 36 for selective output to the digital signal I/O circuit 41, control data I/O circuit 20, memory interface circuit 42, memory circuit 44, recording signal generation circuit 50, reproduced signal processing circuit 48, and error detection and correction circuit (ECC) 46.

In this manner, the recording and playback section of the digital audio tape recorder 1 switches the reference clock signals $2F_S$ and $F_S$ for output. This in turn switches the operating frequencies of the audio signal conversion circuit 21, I/O circuit 40 and digital signal I/O circuit 41 to process the audio signal at the reference sampling signal of 48, 44.1 or 32 KHz. In multiple speed recording or playback mode, the audio signal is processed at two times the reference frequency of 48, 44.1 or 32 KHz.

In normal mode or in double multiple speed recording/playback mode, the system clock signal $S_{SYS}$ is switched to the frequency A or B (MHz). This in turn switches the operating frequencies of the digital signal I/O circuit 41, control data I/O circuit 20, memory interface circuit 42, memory circuit 44, recording signal generation circuit 50, playback signal processing circuit 48, and error detection and correction circuit 46. Thus in multiple speed recording/playback mode, the digital audio signal $D_{AU}$ and playback signal $S_{RF}$ are processed twice as fast as in normal recording mode. Accordingly, the digital audio tape recorder 1 records and playback data at two times the normal speed while effectively avoiding the losses thereof.

The frequency B (MHz) of the system clock signal $S_{SYS}$ is set to be about one and a half times the frequency A (MHz) thereof. The frequency B is in practical terms sufficient to convert the digital audio signal $D_{AU}$ to the recording signal $S_{REC}$ in half of the normal mode cycle, the audio signal $D_{AU}$ in this case having being sampled in multiple speed recording/playback mode at the frequency twice the normal mode sampling frequency. In addition, the frequency B when selected results only in a modest, practically reasonable increase in overall power consumption by the digital signal processing circuit 8.

The I/O circuit 40 converts to a predetermined format a digital audio signal RX that is input in an AES/EBU format to the digital audio tape recorder 1, and outputs the converted signal to the digital signal I/O circuit 41. At the same time, the digital audio signal from the digital signal I/O circuit 41 is output after conversion to a digital audio signal TX in the AES/EBU format.

In this manner, the digital audio tape recorder 1 records and reproduces the digital audio signals TX and RX in the AES/EBU format in addition to the audio signals $S_{IN}$ and $S_{OUT}$, which are analog signals.

The digital signal I/O circuit 31 loads the control data $D_{CONT}$ from an assigned area of the memory circuit 44 at a predetermined timing via the memory interface circuit 42. Based on the control data $D_{CONT}$ thus acquired, the circuit 31 switches the operation mode.

Furthermore, the digital signal I/O circuit 41 counts successive pulses of the clock signal $S_{FS}$ from the selection circuit 36 using an internal counter circuit, not shown. The digital signal I/O circuit 41 thus generates the rotary drum reference signal DREF with an interleaving period of 60 msec for normal LP recording mode, or with an interleaving period of 30 msec for normal SP recording mode and in multiple speed recording/playback mode.

In recording mode, the digital signal I/O circuit 41 selectively inputs the digital audio signal from the I/O circuit 40 or from the audio signal conversion circuit 36, and places the signal consecutively into the memory circuit 44 with reference to the count value in the counter circuit. This divides the digital audio signal into blocks in the interleaving period for storage into the memory circuit 44.

For LP mode recording and SP mode recording in normal mode, the memory circuit 44 accommodates the digital audio signal in blocks of 30 and 60 msec, respectively, the signal having been sampled in accordance with the reference clock signal $F_S$. For LP mode recording in multiple speed recording/playback mode, the digital audio signal is divided into blocks of 30 msec and stored consecutively into the memory circuit 44, the signal having been sampled using the reference clock signal $2F_S$ which is twice the clock signal $F_S$ in frequency.

With the digital audio signal consecutively placed into assigned areas of the memory circuit 44 in reference to the count value in the internal counter circuit, the digital signal I/O circuit 41 interleaves the signal for one interleaving period.

In playback mode, the digital signal I/O circuit 41 loads from the memory circuit 44 the digital audio signal in units of blocks according to the count value of the counter circuit. After reverse interleaving, the digital audio signal is output consecutively to the I/O circuit 40 and audio signal conversion circuit 36 in accordance with the clock signal $S_{FS}$.

As with the digital signal I/O circuit 41, the error detection and correction circuit 46 loads the control data $D_{CONT}$ at an appropriate timing from the memory circuit 44. Based on the control data, the circuit 41 switches the operation mode.

In recording mode, the digital audio signal is loaded consecutively from the memory circuit 44. The signal is divided into blocks, each block being given a parity code made up of an internal and an external code for error correction. These parity codes are placed in the memory circuit 44.

In playback mode, the playback data is loaded consecutively from the memory circuit 44 via the playback signal processing circuit 48. The playback data is subjected to error correction and detection before its storage back to the memory circuit 44.

Figure 7:
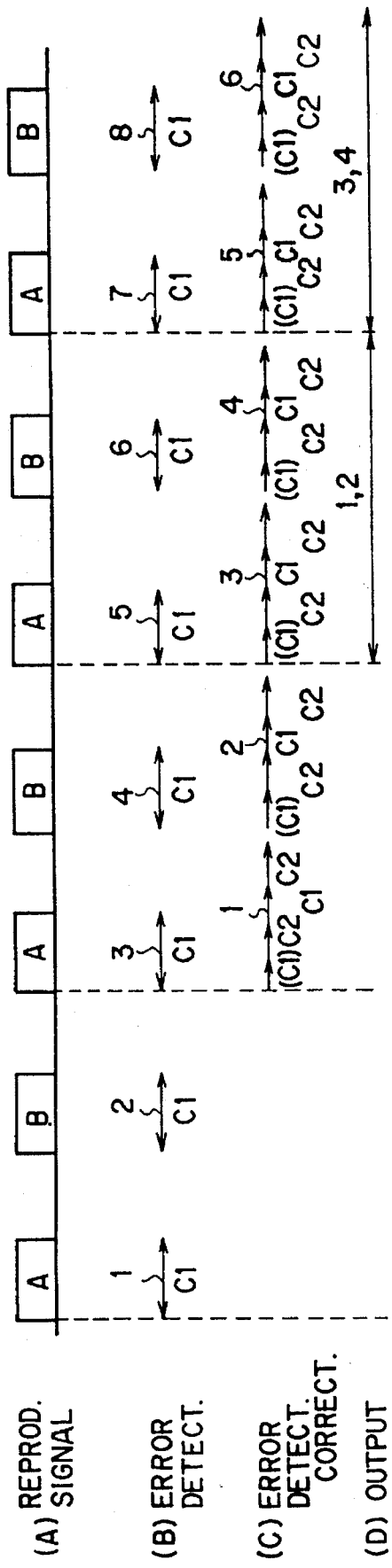
FIG. 7 is a signal waveform chart associated with the rotary drum of FIGS. 5 and 6.

As shown in FIG. 7, upon playback in normal mode, the error detection and correction circuit 46 utilizes, along with the playback signal processing circuit 48, the scheme disclosed in Japanese Patent Application No. 1-197827 and U.S. Pat. No. 4,630,272, the teachings of which are fully incorporated by reference, for error detection and correction, using twice each of codes C1 and C2 comprising internal and external codes for error correction. Upon playback in multiple speed recording/playback mode, the error correction based on the code C2 is omitted once. This makes it possible to secure a period of processing time practically long enough for error correction when the system clock signal $S_{SYS}$ is switched to the frequency B(MHz).

In the setup above, the playback signal $S_{RF}$ (FIG. 7(A)) obtained via the magnetic heads 20A and 20B is subjected to error detection by the playback signal processing circuit 48 using the code C1 (FIG. 7(B)). The error-free reproduced signal is stored into the memory circuit 44.

In the interleaving period that follows, the playback data in the memory circuit 44 is subjected to error detection and correction by the error detection and correction circuit 46 using the codes C2, C1 and C2 in succession (FIG. 7(C)). In the next interleaving period, the error-free, playback data is output via the digital signal I/O circuit 41 (FIG. 7 (D)).

In multiple speed recording/playback mode, the error detection and correction process by the error detection and correction circuit 46 based on the first code C2 is omitted. This makes it possible to playback at multiple speed the digital audio signal that has been error-corrected with a degree of accuracy high enough for practical purposes.

In FIG. 7, reference characters A and B are the playback signals $S_{RF}$ obtained from the magnetic beads 20A and 20B, respectively; and reference numerals 1, 2, 3, etc. on represent the corresponding recording tracks.

As with the digital signal I/O circuit 41, the recording signal generation circuit 50 loads the control data $D_{CONT}$ from the memory circuit 44 at a predetermined timing. The control data is used to switch the operation mode.

In recording mode, the digital audio signal is read from the memory circuit 44 in a predetermined sequence of blocks together with their parity codes. The blocks of the signal are subjected to 8-to-10 modulation.

After converting the modulated signal to serial data, the recording signal generation circuit 50 adds thereto a pilot signal for AFT tracking control and a synchronizing signal. The supplemented signal is then output to the magnetic heads 20A and 20B via the recording and playback amplifier circuit 24 at the timing at which the heads 20A and 20B scan the magnetic tape 10.

The signal is then interleaved in units of blocks via the recording signal generation circuit 50 to become the recording signal $S_{REC}$ which is modulated together with the parity codes attached. This recording signal $S_{REC}$ is output to the magnetic heads 20A and 20B for consecutive recording of the digital audio signal onto the magnetic tape 10.

At this point, the recording signal generation circuit 50 outputs consecutively the modulated recording signal $S_{REC}$ at a transmission rate of 4.704 Mbps or 9.408 Mbps in LP mode or SP mode, respectively, for normal mode recording in reference to the reference clock signal $S_{OSC}$. This allows the digital audio signal to be successively recorded in the format specific to LP or SP mode and in accordance with the speeds at which the rotary drum 16 and the magnetic tape 10 operate.

For multiple speed recording or playback in LP mode, the rotary drum 16 rotates at twice its speed of normal mode. Thus the recording signal $S_{REC}$ is output at a transmission rate of 9.408 Mbps, twice the normal mode rate. In this manner, the digital audio signal is recorded in the same format as for normal recording or playback.

In normal mode, the digital audio signal is sampled according to the reference clock signal $F_S$ before being divided into blocks. The signal in blocks is converted to the recording signal $S_{REC}$ by the digital signal I/O circuit 41, memory interface circuit 42, memory circuit 44, error detection and correction circuit 46 and recording signal generation circuit 50, the circuits operating in reference to the system clock signal $S_{SYS}$ at the frequency A (MHz).

In multiple speed recording/playback mode, the digital audio signal is sampled in accordance with the reference clock signal $2F_S$ before being divided into blocks, the frequency of the signal $2F_S$ being two times that of the clock signal $F_S$. The signal in blocks is converted to the recording signal $S_{REC}$ by the digital signal I/O circuit 41, memory interface circuit 42, memory circuit 44, error detection and correction circuit 46 and recording signal generation circuit 50, the circuits operating in reference to the system clock signal $S_{SYS}$ whose frequency is about one and one half times the frequency A (MHz). The setup above makes it possible to effectively avoid degradation in sound quality when, say, an audio signal reproduced in multiple speed recording/reproducing mode is input to the audio signal conversion circuit 21 for recording.

Where the digital audio signal is directly input for multiple speed recording or playback, the foregoing setup also allows the signal to be recorded while effectively avoiding data losses.

In playback mode, the recording signal generation circuit 50 stops the output of the recording Signal $S_{REC}$ according to the control data $D_{CONT}$.

The clock signal sampling Circuit 33 in playback mode samples a playback clock signal CK from the playback signal $S_{RF}$ available via the recording and playback amplifier circuit 24 in accordance with the clock signal $S_{OSC}$. The playback clock signal CK is output to the playback signal processing circuit 48.

For recording, the playback signal processing circuit 48 stops its operation based on the control data $D_{CONT}$; for playback, the circuit 48 subjects the playback signal $S_{RF}$ to 10-to-8 demodulation in reference to the playback clock signal CK. The resulting playback data is placed successively into assigned areas of the memory circuit 44.

When placing the playback data into the memory circuit 44, the playback signal processing circuit 48 detects error in the data using the code C1 comprising external codes for error correction. The result of the error detection is stored in the memory circuit 44.

Where a magnetic tape 10 recorded in LP mode is played back in normal mode, the reproduced signal processing circuit 48 performs NT servo operation. This causes one block of the playback signal $S_{RF}$, which is output twice, to be demodulated by the scheme disclosed in Japanese Patent Laid-open No. 63-205861 and U.S. Pat. No. 4,862,297, the teachings of which are fully incorporated by reference. The reproduced data is thus demodulated reliably.

After demodulation, the played back data is stored temporarily in the memory circuit 44. The data is then corrected for error by the error detection and correction circuit 46, and is consecutively output via the digital signal I/O circuit 41. In this manner, the digital audio signal recorded on the magnetic tape 10 is played back therefrom.

In normal playback mode, the playback signal $S_{RF}$ having a transmission rate of 9.408 Mbps is processed consecutively in units of blocks by the playback signal processing circuit 48, memory circuit 44, error detection and correction circuit 46, memory interface circuit 42 and digital signal I/O circuit 41, the circuits operating in accordance with the system clock signal $S_{SYS}$ at the frequency A (MHz), the blocks being output successively in synchronization with the reference clock signal $F_S$. In multiple speed recording/ playback mode, the playback signal $S_{RF}$ is processed consecutively in units of blocks by the playback signal processing circuit 48, memory circuit 44, error detection and correction circuit 46, memory interface circuit 42 and digital signal I/O circuit 41, the blocks being output successively in synchronization with the reference clock signal $2F_S$ whose frequency is twice that of the signal $F_S$. This setup makes it possible to effectively avoid degradation in sound quality when, say, an audio signal played back at multiple speed is recorded also at multiple speed by another digital audio tape recorder whose construction control data is used to switch the operation mode.

At this point, in normal playback mode, the system clock signal $S_{SYS}$ at the frequency A (MHz) and the reference clock signal $F_S$ are selectively output from the selection circuits 39 and 36, respectively. In multiple speed recording/playback mode, the system clock signal $S_{SYS}$ at the frequency B (MHz) and the reference clock signal $2F_S$ are selectively output from the selection circuits 39 and 36, respectively. The digital signal processing circuit 8 operates in reference to the selective output from the selection circuit 39 or 36.

For normal mode recording, the digital audio signal $D_{AU}$ is input after being sampled via the audio signal conversion circuit 21 using the reference clock signal $F_S$. The digital audio signal $D_{AU}$ is divided into blocks by the digital signal I/O circuit 41 in one interleaving period of LP or SP mode, the blocks being interleaved and stored into the memory circuit 44.

The digital audio signal, after being stored in the memory circuit 44, is given a parity code for each block thereof by the error detection and correction circuit 46. The signal is then converted to the recording signal $S_{REC}$ via the recording signal generation circuit 50 for output to the magnetic heads 20A and 20B. In turn, the magnetic heads 20A and 20B record the digital audio signal consecutively onto the magnetic tape 10 in the recording format of LP or SP mode.

For multiple speed recording, the digital audio signal $D_{AU}$ is input after being sampled via the audio signal conversion circuit 21 using the reference clock signal $2F_S$ whose frequency is two times that of the clock signal $F_S$. The digital signal I/O circuit 41 divides the digital audio signal $D_{AU}$ into blocks in half of the normal recording cycle, the blocks being interleaved and stored into the memory circuit 44.

The digital audio signal $D_{AU}$ stored in the memory circuit 44 is converted successively to the recording signal $S_{REC}$ as in normal recording mode. At this point, the system clock signal $S_{SYS}$ is switched from frequency A (MHz; for normal mode) to frequency B (MHz), the latter being one and one half times the former. This in turn switches the rotating speed of the rotary drum 16 and the running speed of the magnetic tape 10. As a result, the recording signal $S_{REC}$ is generated having a transmission rate twice that for normal recording, and is output at the timing at which the magnetic tape 10 is scanned by the magnetic heads 20A and 20B. In this manner, the digital audio signal is recorded at twice the normal mode recording speed.

In normal playback mode, on the other hand, the recording signal generation circuit 50 stops its operation, and the playback signal processing circuit 48 starts operating.

After the playback clock signal CK is sampled by the clock signal sampling circuit 52, the playback signal $S_{RF}$ is demodulated by the playback signal processing circuit 48 in reference to the signal CK.

After demodulation, the played back data is stored temporarily into the memory circuit 44. The data is then corrected for error by the error detection and correction circuit 46 and stored into the memory circuit 44. From the memory circuit 44, the error-free played back data is output consecutively via the digital signal I/O circuit 41.

At this point, in normal playback mode, the playback signal $S_{RF}$ is processed consecutively in units of blocks by the playback signal processing circuit 48, memory circuit 44, error detection and correction circuit 46, memory interface circuit 42 and digital signal I/O circuit 41, the circuits operating in reference to the system clock signal $S_{SYS}$ at the frequency A (MHz), the blocks being output successively in synchronization with the reference clock signal $F_S$ via the digital signal I/O circuit 41. In multiple speed recording/ playback mode, the playback signal $S_{RF}$ is processed consecutively in units of blocks by the playback signal processing circuit 48, memory circuit 44, error detection and correction circuit 46, memory interface circuit 42 and digital signal I/O circuit 41, the circuits operating in accordance with the system clock signal $S_{SYS}$ whose frequency is about one and one half times the frequency A (MHz), the blocks being output in synchronization with the reference clock signal $2F_S$ whose frequency is twice that of the clock signal $F_S$.

The setup above makes it possible to effectively avoid degradation in sound quality when, say, an audio signal played back at multiple speed is recorded also at multiple speed. Furthermore, this setup effectively eliminates data losses when the digital audio signal is to be input or output directly.

In the manner described, the clock signal $S_{FS}$ and the system clock signal $S_{SYS}$ are switched in terms of frequency in multiple speed recording/playback mode. This makes it possible to effectively avoid data losses during multiple speed recording or reproducing of audio signal data.

Type B Configuration Operation

Figure 8:
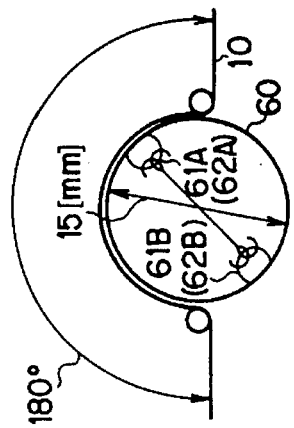
FIG. 8 is a schematic plan showing how type B, C, and D drums can be constructed.

Referring to FIG. 8, a second embodiment comprises a rotary drum 60 with a diameter of 15 mm making up the type B configuration. On the rotary drum 60 are magnetic heads 61A and 61B positioned at 180 degrees to each other and staggered by a half track pitch. The magnetic tape 10 is wound around the rotary drum 60 to form a 180-degree angle.

Referring to FIG. 9, for LP mode recording in normal mode, the servo circuit 12 drives the drum motor 17 and capstan motor 19 as per the mode byte data and status byte data so that the rotating speed N of the rotary drum 60 reaches 2000 rpm and the running speed $V_t$ of the magnetic tape attains 4.075 mm/sec. For SP mode recording in normal mode, the drum motor 17 and capstan motor 19 are likewise driven so that the rotating speed N of the rotary drum 60 reaches 4000 rpm and the running speed $V_t$ of the magnetic tape 10 attains 8.150 mm/sec.

With the type B configuration, the magnetic tape 10 runs by the amount of a single turn of the type A drum while the rotary drum 60 makes two turns. Because the magnetic heads 61A and 61B are staggered when in position, the recording signal is supplied to the magnetic heads 61A and 61B during the first of the two turns made by the rotary drum 60 in order to form recording tracks consecutively in the format specific to the currently configured digital audio tape recorder.

In normal playback mode, the servo circuit 12 drives the drum motor 17 and capstan motor 19 so that the rotating speed N of the rotary drum 60 reaches 4000 rpm and the running speed $V_t$ of the magnetic tape 10 attains 4.075 mm/sec in LP mode or 8.150 mm/sec in SP mode. In LP mode or SP mode, the servo circuit 12 provides tracking control by selecting a suitable tracking control means for semi-NT servo operation or ATF servo operation.

In multiple speed recording/playback mode, the servo circuit 12 drives the drum motor 17 and capstan motor 19 so that the rotating speed N of the rotary drum 60 reaches 4000 rpm and the running speed $V_t$ of the magnetic tape 10 attains 8.150 mm/sec.

Thus for LP mode recording and playback in multiple speed recording/playback mode, the rotary drum 60 and the magnetic tape 10 are driven at twice normal recording speeds while the rotating speed of the rotary drum 60 is held at the same ratio of normal recording relative to the running speed of the magnetic tape 10. This makes it possible to generate the recording signal and process the playback signal $S_{RF}$ at two times their respective speeds of normal recording, thereby achieving multiple speed recording and playback.

In sub-code after-recording mode, the servo circuit 12 drives the drum motor 17 and capstan motor 19 so that the running speed $V_t$ of the magnetic tape 10 and the rotating speed N of the rotary drum 60 reach their respective values of multiple speed recording/playback mode.

Thus with the type B configuration, as with the type A, the servo circuit 12 drives the drum motor 17 and capstan motor 19 at predetermined speeds in accordance with the control data $D_{CONT}$.

The digital signal processing circuit 8 switches the operation mode based on the control data $D_{CONT}$ stored in the memory circuit 44 in the same manner as with the type A. And as with the type A, the rotary drum reference signal DREF is generated and the playback signal $S_{RF}$ and recording signal $S_{REC}$ are processed consecutively in accordance with the reference clock signal $F_S$ and with the system clock signal $S_{SYS}$ at the frequency A (MHz) in normal mode, and according to the reference clock signal $2F_S$ and to the system clock signal $S_{SYS}$ at the frequency B (MHz) in multiple speed recording/playback mode.

Thus the type B configuration, like the type A, effectively avoids data losses during multiple speed recording and playback.

In the digital signal processing circuit 8, the recording signal generation circuit 50 generates, during the first of the two turns made by the rotary drum 60, the recording signal $S_{REC}$ with a transmission rate of 4.704 Mbps in LP mode, or 9.408 Mbps in SP mode.

In this way, the digital audio tape recorder of the type B, like its counterpart of the type A, records audio signals successively in the predetermined format. In playback mode, the playback signal $S_{RF}$ is demodulated at the timing at which the magnetic heads 61A and 61B scan the magnetic tape 10. As with the type A, the signal is consecutively processed in units of blocks for audio signal demodulation.

In multiple speed recording mode, the recording signal $S_{REC}$ with a transmission rate of 9.408 Mbps is generated to maintain compatibility with normal recording mode.

The type B configuration described above allows the clock signal $S_{FS}$ and the system clock signal $S_{SYS}$ to be switched in terms of frequency so as to effectively avoid data losses for multiple speed recording and playback.

Type C Configuration Operation

A third embodiment of the invention, of type C rotary drum configuration, comprises the rotary drum 60 of the type B configuration (FIG. 8) with no stagger provided between the magnetic heads 61A and 61B positioned thereon. In this setup, the magnetic tape 10 is scanned alternately by magnetic heads 62A and 62B at intervals of half-turns made by the rotary drum 60.

Referring to FIG. 10, for LP mode recording in normal mode, the servo circuit 12 drives the drum motor 17 and capstan motor 19 so that the rotating speed N of the rotary drum 60 reaches 1000 rpm and the running speed $V_t$ of the magnetic tape 10 attains 4.075 mm/sec. For SP mode recording in normal mode, the drum motor 17 and capstan motor 19 are driven so that the rotating speed N of the rotary drum 60 reaches 2000 rpm and the running speed $V_t$ of the magnetic tape 10 attains 8.150 mm/sec. An appropriate recording signal is then supplied at the timing at which the magnetic heads 62A and 62B alternately scan the magnetic tape 10, whereby recording tracks are formed consecutively in a predetermined format.

In normal playback mode, the drum motor 17 is driven so that the rotating speed N of the rotary drum 60 reaches 4000 rpm; the capstan motor 17 is driven so that the running speed of the magnetic tape 10 attains 4.075 mm/sec in LP mode and 8.150 mm/sec in SP mode.

Thus in normal playback mode, the running speed of the magnetic tape 10 relative to the rotary drum 60 drops to half of the value for recording in both LP mode and SP mode. The servo circuit 12 then selects semi-NT servo operation for tracking control.

In multiple speed recording/playback mode, the servo circuit 12 drives the drum motor 17 and capstan motor 19 so that the rotating speed N of the rotary drum 60 reaches 4000 rpm and the running speed $V_t$ of the magnetic tape 10 attains 16.30 mm/sec.

Thus in multiple speed recording/playback mode, whether the target magnetic tape 10 is recorded in LP mode or SP mode, the rotating drum 60 turns at four times its normal speed and the magnetic tape 10 runs at twice its normal speed while the rotating speed of the drum 60 is held at the same ratio of recording to the running speed of the magnetic tape 10.

In sub-code after-recording mode, the servo circuit 12 drives the drum motor 17 and capstan motor 19 so that the running speed $V_t$ of the magnetic tape 10 and the rotating speed N of the rotary drum 60 reach their respective values for multiple speed recording or playback.

Thus with the type C configuration, as with the type A, the servo circuit 12 drives the drum motor 17 and capstan motor 19 at appropriate speeds in accordance with the control data $D_{CONT}$.

The digital signal processing circuit 8 switches the operation mode based on the control data $D_{CONT}$ from the memory circuit 44 in the same manner as with the type A. And as with the type A, the rotary drum reference signal DREF is generated and the playback signal $S_{RF}$ and recording signal $S_{REC}$ are processed consecutively in accordance with the reference clock signal $F_S$ and with the system clock signal $S_{SYS}$ at the frequency A (MHz) in normal mode, and according to the reference clock signal $2F_S$ and to the system clock signal $S_{SYS}$ at the frequency B (MHz) in multiple speed recording/playback mode.

Thus the type C configuration, like the type A, effectively avoids data losses during multiple speed recording and playback.

Where a magnetic tape 10 recorded in LP mode is to be recorded or played back in multiple speed recording/playback mode with the type C configuration in use, the magnetic tape 10 may be recorded or played back at four times the speed of the mode in effect. Where a magnetic tape 10 recorded in SP mode is to be recorded or played back in multiple speed recording/playback mode with the type C configuration in use, the magnetic tape 10 may be recorded or played back at twice the speed of recording.

Thus in normal mode and in multiple speed recording/playback mode, the digital signal processing circuit 8 switches the transmission rates of the recording signal $S_{REC}$ in accordance with the rotating speed of the rotary drum 60. This allows the audio signal to be recorded successively in the suitable format as with the type A.

The type C configuration described above allows the clock signal $S_{FS}$ and the system clock signal $S_{SYS}$ to be switched in terms of frequency so as to effectively avoid data losses for multiple speed recording and playback.

Type D Configuration Operation

A fourth embodiment corresponds to a type D configuration. In this embodiment, the rotary drum 60 whose construction is the same as the drum of the type C rotates at a speed lower than the speed of the type C.

As shown in FIG. 11, for normal mode recording, the servo circuit 12 drives the rotary drum 60 and capstan motor 19 under the same conditions as with the type C. For normal mode reproducing, the servo circuit 12 drives the capstan motor 19 so that the rotating speed N of the rotary drum 60 reaches 2000 rpm and the running speed $V_t$ of the magnetic tape 10 attains 4.075 mm/sec in LP mode or 8.150 mm/sec in SP mode.

Thus for normal mode playback, the rotating speed of the rotary drum 60 relative to the magnetic tape 10 is held at half of the value with the type C. Where a magnetic tape 10 recorded in LP mode is played back, the playback signal $S_{RF}$ is obtained by semi-NT servo operation; where a magnetic tape 10 recorded in SP mode is played back, the playback signal $S_{RF}$ is acquired by ATF servo operation.

In multiple speed recording/playback mode or in after-recording mode, the servo circuit 12 drives the drum motor 17 and capstan motor 19 so that the rotating speed N of the rotary drum 60 reaches 2000 rpm and the running speed $V_t$ of the magnetic tape 10 attains 8.150 mm/sec.

When a magnetic tape recorded in LP mode is played back in the current mode mentioned above, the magnetic heads 61A and 61B scan the magnetic tape 10 at the same timing for recording in SP mode. In this manner, ATF servo operation is used to implement the recording or playback process.

In the same manner as with the type A, the digital signal processing circuit 8 generates the rotary drum reference signal DREF and processes the playback signal $S_{RF}$ and recording signal successively in accordance with the reference clock signal $F_S$ and with the system clock signal $S_{SYS}$ at the frequency A (MHz), or according to the reference clock signal $2F_S$ and to the system clock signal $S_{SYS}$ at the frequency A (MHz).

Thus the type D configuration, like the type A, effectively avoids data losses during multiple speed recording and playback.

Furthermore, the digital signal processing circuit 8 generates the recording signal $S_{REC}$ with a transmission rate corresponding to the rotary speed of the rotary drum 60 in normal mode as well as in multiple speed recording/playback mode. This allows the audio signal to be recorded successively in the suitable format as with the type A.

The type D configuration described above allows the clock signal $2F_S$ and the system clock signal $S_{SYS}$ to be switched in terms of frequency so as to effectively avoid data losses for multiple speed recording and playback.

Other Configurations

In the embodiments described above, multiple speed recording and playback are carried out by use of the digital audio tape recorder having a rotary drum diameter of 30 or 15 mm. Alternatively, the invention may be practiced with a digital audio tape recorder having other rotary drum diameters including 20 or 10 mm.

In multiple speed recording/playback mode, the above-mentioned embodiments allow the audio signal to be recorded or reproduced at twice the speed of recording. Alternatively, the invention may be practiced with other embodiments in which the audio signal is recorded or reproduced at various speeds including one and one half times the speed of recording.

Furthermore, the foregoing embodiments are constructed to record and playback the audio signal. Alternatively, the invention may be practiced with magnetic recording and playback equipment such as an external memory device for use by computing apparatus, the device handling data to be computed. This type of memory device allows data to be recorded and reproduced with no losses of data in accordance with the transmission rate of the computing apparatus configured. In this manner, the invention widens the scope of use of the magnetic recording and playback equipment when applied thereto.

The principles of the invention can otherwise be practiced with various kinds of apparatus including a playback or recording-dedicated digital audio tape recorder and magnetic recording devices for recording and playing back data other than audio signals.

While preferred embodiments have been shown, modifications and changes may become apparent to those skilled in the art which shall fall within the spirit and scope of the invention. It is intended that such modifications and changes be covered by the attached claims.

We claim:

1. An apparatus for recording and reproducing digital signals at various recording and reproducing speeds, comprising:
   (a) a rotary drum configuration to rotate at more than one speed;
   (b) a magnetic tape operatively disposed adjacent said rotary drum and at least partially wrapped there around;
   (c) a digital signal input/output circuit configured to operate at more than one frequency and to output and receive digital signals;
   (d) a recording signal generation circuit configured to generate a recording signal for recording on said magnetic tape;
   (e1) a first clock signal generator means configured for generating a first plurality of clocking signals having a first plurality of different frequencies;
   (e2) a second clock signal generator means configured to generate a second plurality of clocking signals having a second plurality of different frequencies;
   (f) a playback signal demodulation circuit configured to demodulate a recorded signal extracted from said magnetic tape to produce a digital signal which is transmitted to said digital signal input/output circuit; and
   (g) circuit means operatively coupled to said rotary drum, said first and second clock signal generator means, said digital signal input/output circuit, and said playback signal demodulation circuit and configured for selecting the rotary speed of said rotary drum and one of said first plurality or said second plurality of clocking signals to operate said digital signal input/output circuit at the frequency of said selected clock signal in accordance with digital control data so that a digital signal entering said digital input/output circuit is converted by said recording signal generation circuit into a recording signal for recording onto said magnetic tape and/or a recorded signal retrieved from said magnetic tape is converted by said playback signal demodulation circuit to a digital signal for output by said digital signal input/output circuit at a rate determined by said selected clocking signal, and configured for selecting the running speed of said tape in accordance with said digital control data so that said tape runs at a constant speed relative to the rotating speed of said rotary drum, said digital control data generated by said circuit means based on the configuration of said apparatus and operating data generated by an operator of the apparatus or by said digital signal input/output circuit.

2. An apparatus for recording and reproducing digital signals at various recording and reproducing speeds, comprising:
   (a) a rotary drum configured to rotate at various speeds;
   (b) a magnetic tape operatively disposed adjacent said rotary drum and at least partially wrapped there around;
   (c) a digital signal input/output circuit configured to operate at more than one frequency and to output and receive the digital signals;
   (d) a recording signal generation circuit configured to generate a recording signal for recording the digital signals on said magnetic tape;
   (e1) a first clock signal generator means configured for generating a first plurality of clocking signals having a first plurality of frequencies;
   (e2) a second clock signal generator means configured for generating a second plurality of clocking signals having a second plurality of different frequencies;
   (f) a playback signal demodulation circuit configured to demodulate a recorded signal extracted from said magnetic tape to produce a digital signal; and
   (g) circuit means operatively coupled to said rotary drum, said first and second clock signal generator means, said digital signal input/output circuit, and said playback signal demodulation circuit and configured for selecting the rotary speed of said rotary drum, running speed of said magnetic tape, and one of said clocking signals for operating said digital signal input/output circuit and said playback signal demodulation circuit at the frequency of said selected clocking signal in accordance with predetermined digital control data so that a digital signal entering said digital input/output circuit is converted by said recording signal generation circuit into a recording signal for recording onto said magnetic tape and/or a recorded signal retrieved from said magnetic tape is converted by said playback signal demodulation circuit to a digital signal for output thereof via said digital signal input/output circuit at a rate determined by said selected clocking signal, said digital control data generated by said circuit means based on the configuration of said apparatus and operating data generated by an operator of the apparatus or by said digital signal input/output circuit.

3. An apparatus for recording and reproducing digital signals at various speeds, comprising:
   (a) a digital signal input/output circuit configured to operate at more than one frequency and to receive and generate as an output digital signals;
   (b) a recording signal generation circuit configured to generate as an output a signal recorded on magnetic tape via a rotary drum;
   (c) a playback signal demodulation circuit configured to demodulate a signal recorded on the magnetic tape to produce a digital signal that is provided to said digital signal input/output circuit;
   (d1) a first clock signal generator means for generating a first plurality of clocking signals having a first plurality of different frequencies;
   (d2) a second clock signal generator means for generating a second plurality of clocking signals having a second plurality of different frequencies; and
   (e) a control data input/output circuit configured to generate as an output a control data signal that is coupled to said rotary drum, said digital signal input/output circuit, said recording signal generation circuit, said playback signal demodulation circuit and said first and second clock signal generator means and configured to select speeds for said rotary drum and said magnetic tape and operating frequencies for said digital signal input/output circuit, said recording signal generation circuit, and said playback signal demodulation circuit in accordance with predetermined digital control data, said digital control data generated by said control data input/output circuit based on the configuration of said apparatus and operating data generated by an operator of the apparatus or by said digital signal input/output circuit.

4. An apparatus for recording and reproducing digital signals at various speeds, comprising:

(a) a digital signal input/output circuit configured to operate at more than one frequency and to receive as an input and generate as an output digital signals;

(b) a recording signal generation circuit configured to generate as an output a signal recorded on magnetic tape via a rotary drum;

(c) a playback signal demodulation circuit configured to demodulate the signal recorded on the magnetic tape to produce a digital signal that is provided to said digital signal input/output circuit;

(d1) a first clock signal generator means configured for generating a first plurality of clocking signals having a first plurality of different frequencies;

(d2) a second clock signal generator means configured for generating a second plurality of clocking signals having a second plurality of different frequencies; and (e) a control data input/output circuit configured to generate as an output a control data signal that is coupled to said rotary drum, said digital signal input/output circuit, said recording signal generation circuit, said first and second clock signal generator means, and said playback signal demodulation circuit, and configured to select speeds for said rotary drum and said magnetic tape in accordance with predetermined digital control data, said digital control data generated by said control data input/output circuit based on the configuration of said apparatus and operating data generated by an operator of the apparatus or by said digital signal input/output circuit.

5. An apparatus for recording and reproducing digital signals at various speeds, comprising:

(a) a digital signal input/output circuit configured at more than one frequency and operative to receive as an input and generate as an output digital signals;

(b) a recording signal generation circuit configured to generate as an output a signal recorded on magnetic tape via a rotary drum;

(c) a playback signal demodulation circuit configured to demodulate a signal recorded on the magnetic tape to produce a digital signal that is provided to said digital signal input/output circuit;

(d1) a first clock signal generator means configured for generating a first plurality of clocking signals having a first plurality of different frequencies;

(d2) a second clock signal generator means configured for generating a second plurality of clocking signals having a second plurality of different frequencies; and (e) a control data input/output circuit configured to generate as an output a control data signal that is coupled to said rotary drum, said digital signal input/output circuit, said recording signal generation circuit, said first and second clock signal generator means, and said playback signal demodulation circuit and operative to select operating frequencies for said digital signal input/output circuit, said recording playback generation circuit, and said playback signal demodulation circuit in accordance with predetermined digital control data, said digital control data generated by said control data input/output circuit based on the configuration of said apparatus and operating data generated by an operator of the apparatus or by said digital signal input/output circuit.

* * * * *